United States Patent [19]

Hong et al.

[11] Patent Number: 4,965,603

[45] Date of Patent: Oct. 23, 1990

[54] OPTICAL BEAMFORMING NETWORK FOR CONTROLLING AN RF PHASED ARRAY

[75] Inventors: John H. Hong, Moorpark; Ian C. McMichael, Port Hueneme, both of Calif.

[73] Assignee: Rockwell International Corporation, El Segundo, Calif.

[21] Appl. No.: 388,789

[22] Filed: Aug. 1, 1989

[51] Int. Cl.$^5$ .......................... H01Q 3/22; G01B 9/02; G02B 1/12

[52] U.S. Cl. .................................... 342/372; 356/349; 350/3.68

[58] Field of Search ........................ 342/368, 371, 372; 350/3.68, 3.82, 3.80, 174; 356/349, 435

[56] References Cited

U.S. PATENT DOCUMENTS 4,280,764 7/1981 Sica, Jr. et al. .................... 365/35.5
4,718,749 1/1988 Chiou et al. ........................ 350/163

FOREIGN PATENT DOCUMENTS 0172568 2/1986 European Pat. Off. ............ 356/349

OTHER PUBLICATIONS

Koepf. Optical Processor for Phased Array Antenna Beam Formation, SPIE vol. 477, Optical Tech, for Microwave Applications, 1984.

Koepf, G. A., "Optical Processor for Phased-Array Antenna Beam Formation", SPIE vol. 477, 75-81 (1984).

*Primary Examiner*—Gregory C. Issing
*Attorney, Agent, or Firm*—John C. McFarren; H. Fred Hamann

[57] ABSTRACT

An optical beamforming network is provided for controlling the RF radiation pattern of a phased array antenna. Light from a first laser is modulated by a spatial light modulator that is user-programmed with the desired far field radiation footprint. The modulated light beam is directed through a Fourier transform lens and onto a beam splitter where it is combined with light from a second laser that is frequency offset by the RF center frequency of the antenna. Light from the beam splitter is recovered by first and second fiber optic bundles. Each optical fiber leads to a corresponding photodetector that detects the beat frequency produced by the two frequency offset light beams. The outputs of corresponding photodetectors of the two fiber optic bundles are combined to control the radiation of a corresponding radiation element of the phased array. The use of two sets of optical fibers and photodetectors improves the signal-to-noise ratio of the system. An alternative embodiment of the invention uses photorefractive crystals to pass phase conjugate return beams back through the optical lenses to cancel lens-induced aberrations from the spatially modulated light beam. This embodiment reduces distortion of the far field radiation pattern without the use of high quality optical lenses.

6 Claims, 1 Drawing Sheet

OPTICAL BEAMFORMING NETWORK FOR CONTROLLING AN RF PHASED ARRAY

TECHNICAL FIELD

The present invention relates to optical systems and, in particular, to an optical beamforming network for controlling a radio frequency phased array antenna.

BACKGROUND OF THE INVENTION

A phased array antenna is a network of radiating elements, each of which is usually non-directive (i.e. isotropic), having a cooperative radiation pattern that is a highly directive beam. Whereas conventional radar antennae have to be mechanically steered to meet beam directing requirements, a phased array achieves the same effect electronically by changing the phase of the signal radiated by each element. Thus, accurate beams are formed and directed simply by driving each element of the array with a signal having an appropriate phase. As a further advantage, electronic steering is much faster than mechanical steering.

The flexibility of electronic steering provided by phased arrays requires individual control of each element. In an array having N elements, each of the elements is driven with a different phase of the same signal. In conventional systems, a single microwave signal is split into N equal signals, and a phase shifting network is provided for each radiating element for individual phase control. For large arrays, however, the cost and complexity of the power splitting network become limiting factors, and the computation required to calculate the array phase distribution for a desired radiation pattern becomes a non-trivial problem.

An optical beamforming network (OBFN) has been described by G.A. Koepf in "Optical processor for phased array antenna beam formation," SPIE, Vol. 477 (1984), as a system that addresses the limitations of large arrays. In an OBFN, microwave hardware is replaced by more wieldy fiber optics and modulation/demodulation devices. In addition, the problem of computing the phase of each array element is addressed with a simple coherent oPtical system using Fourier optics in conjunction with spatial light modulators. However, a high quality Fourier transforming lens must be used because aberrations produced by the lens cause inaccuracies in beam pointing and broadening. Thus, there is a need for improvements in the basic OBFN to ease alignment problems and to nullify the requirement for high quality optics.

SUMMARY OF THE INVENTION

The present invention comprises an optical beamforming network (OBFN) for controlling a radio frequency (RF) phased array antenna. The OBFN combines the information transmission function of optical fibers with the function of optically computing the Fourier transform of an amplitude distribution rapidly and in parallel to accomplish the radiation forming and directing tasks necessary for operation of the phased array antenna.

Radiation of a phased array antenna, such as a radar antenna for example, is steered electronically by controlling the phase of each individual radiation element. To control the phased array, the OBFN of the present invention comprises a spatial weight computation system that includes a laser light source, a spatial light modulator (SLM), a Fourier transform lens, and an array of photodetectors; a temporal control system that supplies a frequency shifted optical reference wave; and an optical fiber bundle that distributes the optical signals to the photodetector array corresponding to the array of radiation elements. In one embodiment of the invention, a second array of photodetectors is utilized to increase the signal-to-noise ratio by recovering the otherwise lost portions of the optical beams passing through a beam splitter that combines the modulated beam with the reference wave. In another embodiment of the invention, phase conjugate devices are used to correct aberrations caused by the lens system and to ease alignment problems inherent in the interferometric OBFN system.

BRIEF DESCRIPTION OF THE DRAWINGS

For a more complete understanding of the present invention and for further advantages thereof, the following Description of the Preferred Embodiments makes reference to the accompanying Drawings, in which.

DESCRIPTION OF THE PREFERRED EMBODIMENTS

Figure 1:
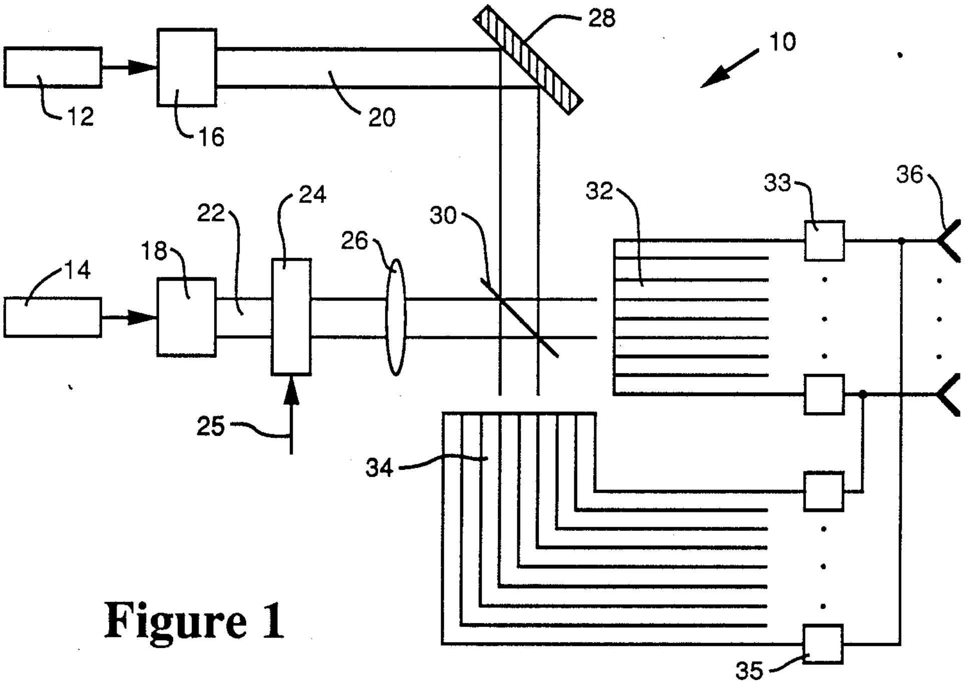
FIG. 1 is a block diagram of an optical beamforming network of the present invention having two photodetector arrays for an improved signal-to-noise ratio.

A block diagram of an optical beamforming network (OBFN) 10 of the present invention is illustrated in FIG. 1. OBFN 10 uses two frequency stabilized lasers 12 and 14 as separate sources of light to provide a frequency offset for heterodyne detection. Distributed feedback lasers and external cavity semiconductor lasers that provide frequency stability in the KHz range at near infrared wavelengths are currently available. Diode laser pumped YAG lasers also exhibit high efficiency and good spatial and temporal stability. Such lasers have an advantage in that intra-cavity doubling crystals can be used to produce highly efficient visible laser radiation. An inexpensive frequency stabilized source is the actively stabilized He-Ne laser marketed by the Newport Corporation. In OBFN 10, temporal interference between lasers 12 and 14 produces the appropriate microwave center frequency of the phased array. Because the KHz range noise from the interference phenomena occupies a very small fractional bandwidth with respect to the approximately 20 GHz center frequency of the array, the beam pointing performance of the array is affected only minimally by that noise. With external feedback control of the lasers, it may be possible to reduce the frequency of the noise to the 10 Hz range.

Light from laser 12 is input to a beam expander 16 that generates a light beam 20. Likewise, light from laser 14 is input to a beam expander 18 that generates a light beam 22. Beam 20 is reflected by a mirror 28 onto a beam splitter 30. Beam 22 is directed to a spatial light modulator (SLM) 24 that generates a modulated light beam that is directed by a lens 26 onto beam splitter 30. Beam splitter 30 combines and splits the light from the two incident beams, and directs the light to first and second fiber optic bundles (FOBs) 32 and 34. The light incident on FOBs 32 and 34 contains the beat frequency generated by the combination of the two beams incident on beam splitter 30. FOBs 32 and 34 each comprise a plurality of optical fibers that terminate at a corresponding plurality of photodetectors, such as photodetectors 33 and 35. The electrical signal output by each photodetector of FOB 32, such as photodetector 33, is combined with the signal output by its corresponding photodetector of FOB 34, such as photodetector 35. Each of the combined signals from corresponding photodetectors controls a corresponding radiation element, such as element 36, of the phased array antenna. OBFN 10 can function with only FOB 32, but half the light from beam splitter 30 would then be lost. The signal-to-noise ratio is improved by using the second FOB 34 to capture the otherwise unused light from beam splitter 30. Because the signal from a photodetector in FOB 34 is the negative of the signal from the corresponding photodetector in FOB 32, a differential amplifier (not shown) is used to combine the signals before they are input to the corresponding radiation element of the array.

In the present invention, the radiation pattern of the phased array is steered electronically by controlling the phase of each individual radiator, such as element 36. The antenna is typically a two-dimensional array of radiating elements, although it is illustrated in the FIGURES as a linear array for simplicity. The amplitude of the far field radiation pattern of the array can be expressed as a function of the angle from the boresight of the antenna. This function is essentially the Fourier transform of the phase distribution across the array. In coherent optics, and important to the operation of OBFN 10, there is a similar relationship between the optical field amplitudes at the front and back focal planes of a lens.

In OBFN 10, the desired far field "footprint" of the antenna is input to SLM 24 as indicated by arrow 25. Coherent beam 22 is passed through SLM 24 to pick up the desired footprint. A Fourier transform is then accomplished by passing the beam through lens 26. The resulting amplitude at the back focal plane of lens 26 is sampled discretely by the array of optical fibers making up FOBs 32 and 34. Reference beam 20, which has a frequency offset by the microwave center frequency of the antenna array, is also incident on the back focal plane of lens 26. As a result, each photodetector of the array yields the beat frequency between the two optical signals incident on its corresponding optical fiber. The photodetector signals control the elements of the array so that they cooperatively emit radiation with a far field amplitude that is the Fourier transform of the complex weight distribution of the array. Thus, the far field radiation pattern closely resembles the footprint input to SLM 24.

SLM 24 serves as the input interface to the user of OBFN 10 to specify the radiation footprint of the antenna. Therefore, the resolution of SLM 24 must be sufficiently high to yield an accurately directable radiation pattern. The inverse sinusoidal relationship between the position on SLM 24 and the far field angle from the boresight places a more difficult resolution requirement on the pixels near the borders of SLM 24 because they correspond to angles far from the boresight. The maximum contrast ratio of SLM 24 is important because lower contrast ratios result in artificially high sidelobe levels in the far field pattern. In addition, the speed at which the pattern in SLM 24 can be updated limits the ultimate speed at which the radiation pattern of the antenna can be reconfigured.

Currently available SLM technologies include liquid crystal light valves, magneto-optic devices, and liquid crystal televisions. A liquid crystal light valve, such as manufactured by the Hoechst-Celanese Corporation, is an optically controlled device. Thus, an electronic to optical converter, such as a CRT, is required unless the user supplies an optical pattern directly to the liquid crystal light valve. Liquid crystal televisions, although having lower resolution, have the advantage of directly interfacing with computers and other electronic devices.

The optical fibers of FOBs 32 and 34 that receive the processed light beams typically have a core section in which the optical power is concentrated, a cladding region with a lower index surrounding the core, and an outer jacket that serves to protect the fiber and reduce microbending losses. The outer jacket may be opaque to minimize crosstalk between the fibers, which are typically bundled in a rectangular array.

Figure 2:
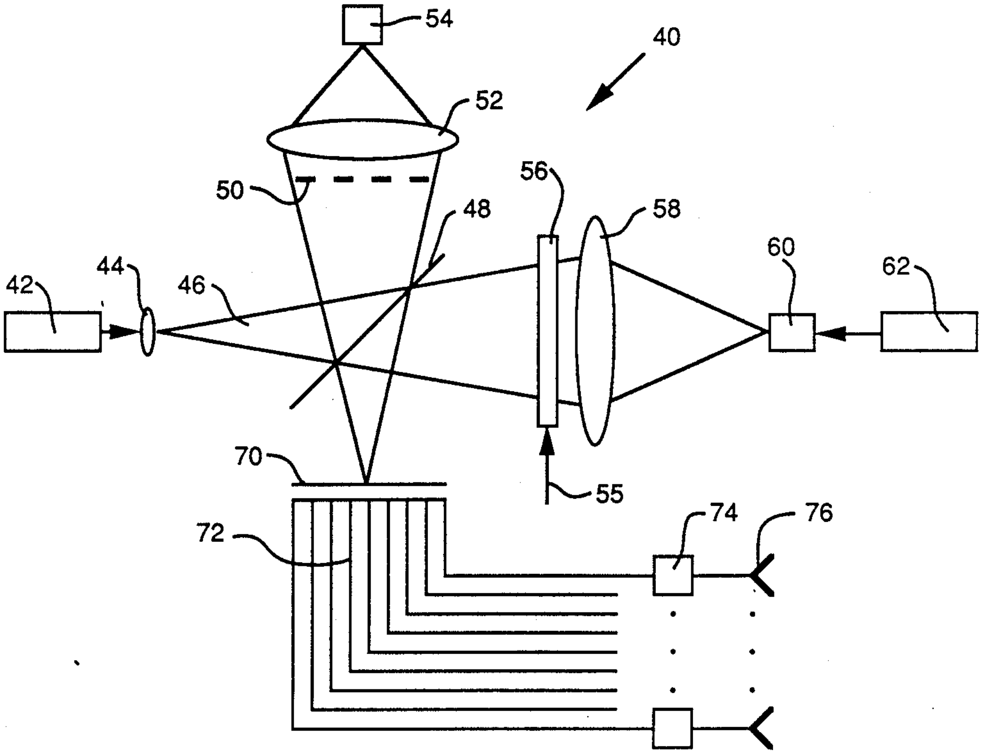
FIG. 2 is a block diagram of an optical beamforming network of the present invention using phase conjugate optics.

Another embodiment of the present invention is illustrated in FIG. 2 and identified as OBFN 40. OBFN 40 uses phase conjugate optics to nullify the requirement of high quality optics and to ease the alignment problems inherent in the interferometric system of OBFN 10. In OBFN 10, aberrations in Fourier transform lens 26 must be minimized because they have a significant effect on the far field radiation pattern of the antenna. Likewise, air currents in the interferometric system of OBFN 10 must be minimized because they can introduce distortions in the far field radiation pattern as well. The phase conjugate system of OBFN 40 is designed to achieve real time correction of these causes of far field pattern distortion.

Photorefractive crystals such as $BaTiO_3$ constitute a class of materials that can be used as highly efficient phase conjugators. When an optical wave of arbitrary phase front passes through a phase aberrator, such as a bad lens, and is focused into a phase conjugator, a new wave is generated by the phase conjugator that is exactly the phase conjugate of the incoming distorted wave. The phase conjugate wave retraces the path traversed by the incoming wave back through the aberrator to emerge as a replica of the original wavefront without aberrations.

OBFN 40 uses two types of phase conjugators, a self pumped phase conjugator (SPPC) and a mutually pumped phase conjugator (MPPC). When an input wave is focused into an appropriately oriented SPPC, a phase conjugate return wave is generated automatically through stimulated scattering effects within the crystal. In an MPPC, first and second temporally incoherent light beams are directed into opposite sides of an appropriately oriented crystal. There is cross mixing of information in the MPPC so that the phase conjugate return for the first beam has the spatial phase conjugate wavefront of the first beam but the temporal properties of the second beam. Likewise, the phase conjugate return for the second beam has the spatial phase conjugate wavefront of the second beam but the temporal properties of the first beam.

Referring to FIG. 2, OBFN 40 is a phase conjugate optical beamforming network that is essentially a Michelson-type interferometer. Light from a laser 42 is expanded, by beam expander 44, into a spherical wave 46 that is split into two paths by a beam splitter 48. The upper path of the beam passes through an amplitude grating 50 and is focused by a lens 52 into an SPPC 54. The phase conjugate wave returned by SPPC 54 passes back through lens 52, grating 50, and beam splitter 48 to be received at Fourier transform plane 70 by a plurality of optical fibers that form an FOB 72. Amplitude grating 50 is designed to focus the phase conjugate diffraction pattern at each optical fiber position of FOB 72.

The other path of light beam 46 passes through an SLM 56 and is focused by a lens 58 into an MPPC 60. The desired RF radiation footprint of the antenna is input to SLM 56 by the user as indicated by arrow 55. MPPC 60 is pumped by a second laser 62 at a frequency that is shifted with respect to the output of laser 42 by the RF center frequency of the antenna. The phase conjugate return from MPPC 60 has the spatial information of the beam from SLM 56 but the temporal information provided by laser 62. The phase conjugate return passes back through lens 58 and SLM 56 to be combined by beam splitter 48 with the return from SPPC 54 and then directed to FOB 72. The amplitude modulation impressed on beam 46 by SLM 56 is not unraveled by the phase conjugation process. Therefore, the amplitude distribution of the phase conjugate return from MPPC 60 at plane 70 is the Fourier transform of the RF footprint impressed on beam 46 by SLM 56. The process of phase conjugation in conjunction with the double passage of the light through SLM 56 and lenses 52 and 58 has the effect of cancelling the aberrations of the optical elements. The combination of the two phase conjugate returns that are frequency offset from each other generates a beat frequency at each optical fiber that is transmitted to its corresponding photodetector, such as photodetector 74. The output of each photodetector is provided to its corresponding antenna radiation element, such as element 76, to control the radiation pattern of the phased array as described above in conjunction with OBFN 10.

Although the present invention has been described with respect to specific embodiments thereof, various changes and modifications may be suggested to one skilled in the art. Therefore, it is intended that the present invention encompass such changes and modifications as fall within the scope of the appended claims.

We claim:

1. An optical beamforming network for controlling a phased array antenna, comprising:
- means for providing a first beam of coherent light;
- means for providing a reference beam of coherent light;
- means for distributing said reference beam;
- means for spatially modulating said first beam, said spatially modulated beam carrying a footprint of a desired antenna radiation pattern;
- means for providing a Fourier transform of said spatially modulated beam;
- means for generating a frequency shifted phase conjugate return of said modulated and transformed beam;
- means for combining said frequency shifted phase conjugate return with said distributed reference beam to generate a distributed beat frequency; and
- means for receiving and detecting said distributed beat frequency to control the phased array antenna.

2. The optical beamforming network of claim 1, wherein said light beam providing means comprise:
- a frequency stabilized laser for providing said first coherent light beam;
- an amplitude grating;
- a beam splitter for reflecting a portion of said first beam through said amplitude grating; and
- a self pumped phase conjugator for receiving said reflected portion of said first beam and generating said distributed reference beam.

3. The optical beamforming network of claim 2, wherein said means for generating said frequency shifted phase conjugate return comprises a mutually pumped phase conjugator.

4. The optical beamforming network of claim 3, wherein said distributed beat frequency receiving means comprises a fiber optic bundle having a plurality of optical fibers, each of said fibers connected to a corresponding photodetector that controls a corresponding element of the phased array antenna.

5. An optical beamforming network for controlling a phased array antenna, comprising:
- a frequency stabilized laser for providing a beam of coherent light;
- a beam splitter for splitting said laser beam into a first beam and a reflected beam;
- an amplitude grating and a self pumped phase conjugator for receiving said reflected beam and generating a distributed reference beam;
- a spatial light modulator for modulating said first beam to include a footprint of a desired antenna radiation pattern;
- an optical lens for providing a Fourier transform of said modulated first beam;
- a mutually pumped phase conjugator for generating a frequency shifted phase conjugate return of said modulated and transformed first beam;
- means for combining said frequency shifted phase conjugate return with said distributed reference beam to generate a distributed beat frequency; and
- means for receiving and detecting said distributed beat frequency to control the phased array antenna.

6. The optical beamforming network of claim 5, further comprising a second laser for pumping said mutually pumped phase conjugator at a frequency offset from the frequency of said frequency stabilized laser to generate said frequency shifted phase conjugate return.

* * * * *